Aug. 13, 1935. P. E. DUGGAN 2,011,272
CONTROL SWITCH FOR MOVING PICTURE PROJECTORS
Filed April 18, 1933
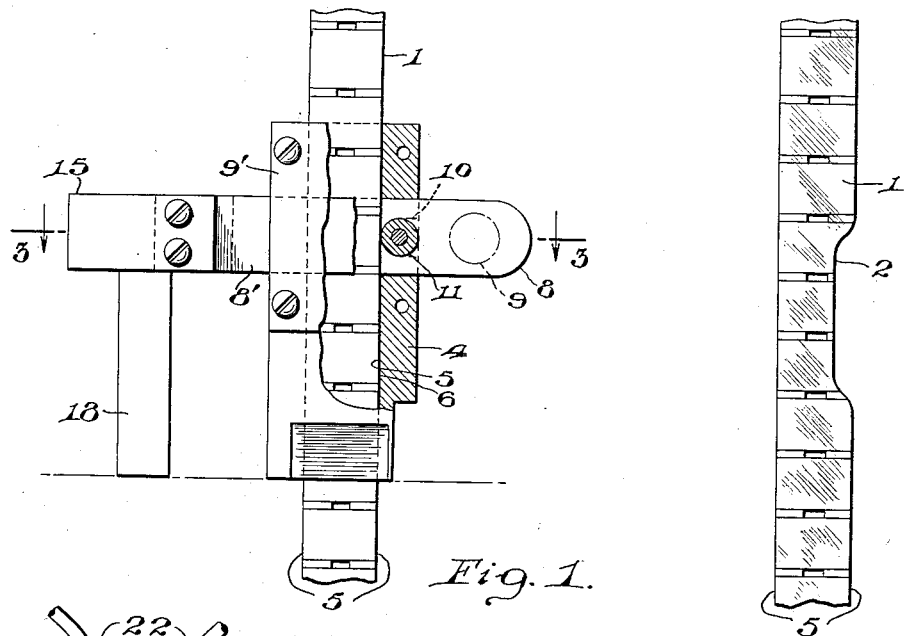
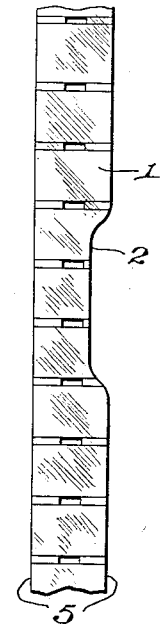
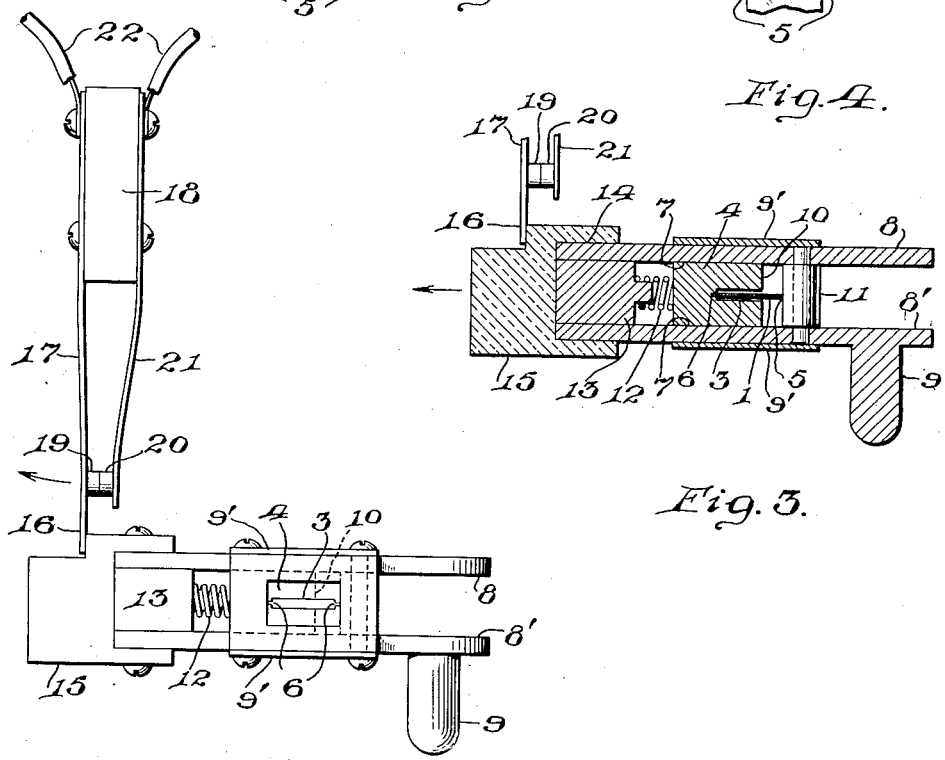
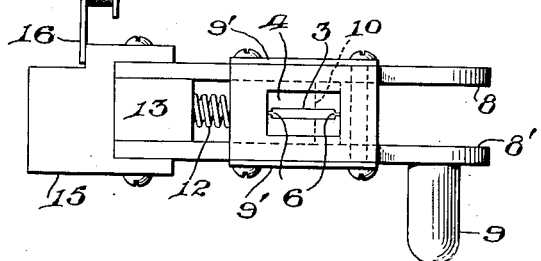
INVENTOR
Paul E. Duggan,
BY
J. Stuart Freeman
ATTORNEY Patented Aug. 13, 1935

2,011,272

UNITED STATES PATENT OFFICE 2,011,272

CONTROL SWITCH FOR MOVING PICTURE PROJECTORS

Paul E. Duggan, Philadelphia, Pa.

Application April 18, 1933, Serial No. 666,677

3 Claims. (Cl. 200—52)

The object of the invention is to provide improvements in an electric switch used in motion picture projectors and actuated by and/or in accordance with the film, to control the operation of the driving motor and/or the film illuminating means.

Heretofore, it is known that various means have been designed to shut off the motor and possibly also the light at the end of the film, and that for this purpose as many different forms of more-or-less complicated and frequently delicate mechanisms have been provided. However, in the present instance there is provided a switch of the utmost simplicity, inexpensive production and efficiency in operation, adapted to shut off the electric current to the film-actuating motor and light at any desired point or points intermediate the ends of the film, and particularly making it possible to operatively associate with a projector suitable coin-controlled means, by means of which the projector may be run for a given predetermined portion of a film upon the insertion into such means of the proper coin.

Primarily, this device was developed for projectors which handle only 8 mm., 9 mm., or possibly as wide as 16 mm. film, which consistent with their relatively narrow widths as compared with the heavier 35 mm., standard film, are very thin and fragile, measuring only about .002 to .005 inch in thickness, and are consequently capable of withstanding only a very light transverse thrust against either of their respective lateral edges. Consequently, the present construction is unnecessarily sensitive for projectors handling 35 mm., film, while projectors of this standard size are insufficiently sensitive and are usually more complicated than is required for the narrower types.

With these broadly stated objects in view, the invention comprises further details of construction and operation, which are fully brought out in the following description, when read in conjunction with the accompanying drawing, in which Fig. 1 is a partial fragmentary front elevational view of that portion of a moving picture projecting machine which embodies one form of the present invention;

Fig. 2 is a top plan view of the same;

Fig. 3 is a horizontal section on the line 3—3 Fig. 1; and

Fig. 4 is a fragmentary portion of a strip of film, cut as hereinafter described for the purpose of operating the improved switch.

Referring to the drawing, the usual film 1 is so cut as to provide an elongated notch 2 at whatever point or points that it is desired to arrest the projection of the transparent pictures or photographs which said film carries. This film is adapted to pass longitudinally thru a transversely elongated channel 3 in a tracker member 4, said channel being of greater width than the thickness of said film, thruout the major transverse dimension of said channel, said film being actually guided by means of its laterally opposite edges 5 passing slidably thru the oppositely directed reduced extensions 6 of said channel 3, this being for the obvious purpose of preventing wear and scratching of the central portion of said film as a result of contact with the walls of said channel, as would be the case if said channel were no wider than the thickness of the film.

The tracker member 4 is provided in its respective forward and rear surfaces, intermediate its upper and lowermost portions with horizontally extending grooves 7, in which are slidably mounted parallel bars 8 and 8', the forwardmost of said bars 8' being provided with a manually engageable lug 9, said bars being maintained in said grooves by detachable plates 9'. Said tracker is also provided in its right hand side (as viewed in the drawing) with a recess 10, which at its innermost extent intersects the channel 3. In this last-named recess is positioned a roller 11, which rotates between and is supported by the spaced bars 8 and 8', said roller normally bearing lightly against the adjacent edge 5 of the film 1, under the influence of a suitable spring 12, which bears against and extends between the opposite or left hand side of the tracker member 4, and a member 13, which spaces apart the adjacent ends of said bars, within an enlarged recess 14 in an electrically insulating member 15. Said last-named member bears against or may be secured to the freely extending end portion 16 of a resilient, electrically conductive arm 17 carried by an insulating support 18, said arm in turn carrying a contact 19, which is adapted to be in normally electrical engagement with a similar contact 20 supported by an arm 21, which is also carried by the support 18.

From the arms 17 and 21 lead wires or other conductors 22 to the motor (not shown) which normally functions to feed the film 1 thru the projecting machine, to which it is assumed this switch is adapted to be connected or mounted upon, said wires also leading if desired to the lamp or other source of light whereby the film is illuminated while being run thru said projector.

As hereinbefore referred to, it is often desired to arrest the movement of a film thru a projecting machine at one or more points thruout the length of said film, particularly as when said projector is operated to show less than an entire length of film, upon the insertion of a coin into a suitable coin-controlled device, which also may be attached to or connected with said projector. In any such case, as the left hand is being used to insert the film 1 thru the channel 3, the lug 9 may be moved by the right hand toward the right so as to shift the roller 11 out of the path and freely beyond the limit of the adjacent edge 5 of said film. After a portion of the film of the normal maximum width has passed beneath said roller the lug may be released, and said roller will thereafter press lightly against the film edge under the tension of the spring 12. With this arrangement, when the roller is bearing against an engaged portion of the film edge, the contacts 19 and 20 are in closed position, so that the motor and light of the projector may be both functioning. However, as the film strip progresses through the tracker channel 3, and a cut-out portion 2 passes therethru, the spring 12 will automatically force the contacts 19 and 20 apart, upon the roller 11 entering such cut-out portion of the film, with the result that the motor and source of illumination of the projecting machine are instantly and automatically shut off from further functioning, until such time as the film is further moved thru the tracker channel and the roller again rises upon the normal width portion thereof.

In conclusion, it should be stated that the improved switch herein described is adapted for attachment to motion picture projectors immediately above the film-advancing claw, and that the sprockets customarily employed to propel the film are dispensed with, since their use in projectors tends to break the film, when the latter is continuous and the projectors are placed as coin-controlled devices in public places, and in which case the film runs either a predetermined or full length for each operation of the motor by the coin-controlled switch, and without any personal attention as to starting, stopping, threading, and re-winding.

Having thus described my invention, what I claim and desire to protect by Letters Patent of the United States is:—

1. The combination of a tracker member having a channel provided with opposed relatively narrow grooves thru which channel a film is adapted to pass, only the marginal portions of the film contacting with the sides of said grooves, a transversely extending recess in said member intersecting one of said channel grooves, a bar reciprocatable with respect to said member, a member carried by said bar and movable in said recess as it bears against the edge of a film, and a switch element connected to said bar and operable upon the movement thereof, as said last-named member enters a portion of the film differing from normal width, to open said switch.

2. The combination of a tracker member having a channel, thru which a film is adapted to pass, a transversely extending recess in said member intersecting said channel, oppositely positioned grooves also in said member, spaced parallel bars reciprocatable within said grooves, a member carried by and between said bars and movable in said recess as it bears against the edge of a film, a switch element connected to said bars, and means normally tending to maintain said element in open position, and a film of normal width in said channel being operative against said last-named means to maintain said switch in closed position.

3. The combination in a film projecting device, of a tracker member having an oppositely grooved channel thru which a film of normal width is adapted to pass, only the marginal portions of the film engaging the sides of said channel grooves, a recess also in said member and intersecting said channel, a reciprocatable unit carried by said member and having a portion extending in said recess and normally engaging the edge of a film within said channel, a spring to maintain said portion against the film, a switch element connected to and movable with said unit to control the operation of the motor employed to drive the film.

PAUL E. DUGGAN.